United States Patent
Dyachenko et al.

(10) Patent No.: US 10,608,950 B2
(45) Date of Patent: Mar. 31, 2020

(54) METHOD OF AND SERVER FOR TRANSMITTING A PERSONALIZED MESSAGE TO A USER ELECTRONIC DEVICE

(71) Applicant: YANDEX EUROPE AG, Lucerne (CH)

(72) Inventors: Yury Igorevich Dyachenko, Kurgan (RU); Mikhail Nikolaevich Kuzmin, Moscow (RU); Denis Aleksandrovich Chernilevsky, Moscow (RU); Yevgeny Aleksandrovich Shablinsky, Kotelniki (RU)

(73) Assignee: YANDEX EUROPE AG, Lucerne (CH)

( * ) Notice: Subject to any disclaimer, the term of this patent is extended or adjusted under 35 U.S.C. 154(b) by 90 days.

(21) Appl. No.: 16/009,441

(22) Filed: Jun. 15, 2018

(65) Prior Publication Data
US 2019/0166064 A1    May 30, 2019

(30) Foreign Application Priority Data
Nov. 30, 2017 (RU) ................ 2017141735

(51) Int. Cl.
*G06F 15/16* (2006.01)
*H04L 12/911* (2013.01)
(Continued)

(52) U.S. Cl.
CPC .............. *H04L 47/70* (2013.01); *H04L 67/10* (2013.01); *H04L 67/28* (2013.01); *H04L 63/00* (2013.01);
(Continued)

(58) Field of Classification Search
CPC ................ H04L 67/02; H04L 67/20
See application file for complete search history.

(56) References Cited

U.S. PATENT DOCUMENTS 7,058,633 B1 * 6/2006 Gnagy .............. G06F 16/9566
8,819,539 B1    8/2014 Colton et al.
(Continued)

FOREIGN PATENT DOCUMENTS

DE    102015115108 A1    3/2017
RU    2611965 C2    3/2017
WO    2016189465 A1    12/2016

OTHER PUBLICATIONS

Search Report with regard to the counterpart RU Patent Application No. 2017141735 dated Jan. 21, 2020.
(Continued)

*Primary Examiner* — Hieu T Hoang
(74) *Attorney, Agent, or Firm* — BCF LLP

(57) ABSTRACT

There is disclosed a method for sending personalized content to an electronic device associated with a user. The e method executable in a personalized content system, the personalized content system including a communication network; a network resource server hosting a network; a personalized content server coupled to the communication network and accessible by the network resource server and the electronic device via the communication network. The network resource having a generic content link and a personalized content link. The method comprises parsing, by the personalized content server, content of the network resource, to detect a plurality of links contained therein, the plurality of links including the generic content link and the personalized content link; executing, by the personalized content server, a link obfuscation routine, transmitting the content of the network resource with the plurality of links having been obfuscated to the electronic device.

20 Claims, 10 Drawing Sheets

(51) Int. Cl.
*H04L 29/08* (2006.01)
*H04L 29/06* (2006.01)

(52) U.S. Cl.
CPC .............. *H04L 67/02* (2013.01); *H04L 67/06* (2013.01); *H04L 67/1097* (2013.01); *H04L 67/20* (2013.01)

(56) References Cited

U.S. PATENT DOCUMENTS

| | | | |
|---|---|---|---|
| 8,832,276 | B2 | 9/2014 | Hind et al. |
| 2005/0044185 | A1* | 2/2005 | Hind ........................ H04L 29/06 709/219 |
| 2005/0267981 | A1 | 12/2005 | Brumley et al. |
| 2008/0319862 | A1 | 12/2008 | Golan et al. |
| 2009/0070873 | A1* | 3/2009 | McAfee .................. G06F 21/56 726/23 |
| 2009/0125719 | A1* | 5/2009 | Cochran ................ G06Q 30/02 713/171 |
| 2014/0150019 | A1 | 5/2014 | Ma et al. |
| 2014/0229298 | A1 | 8/2014 | Grun |
| 2015/0058141 | A1 | 2/2015 | Yablonka et al. |
| 2015/0170072 | A1 | 6/2015 | Grant et al. |
| 2016/0063578 | A1 | 3/2016 | Carasso |
| 2016/0253718 | A1* | 9/2016 | Carasso ................ G06F 16/957 705/14.73 |
| 2017/0109797 | A1* | 4/2017 | Boffa ................ G06Q 30/0277 |
| 2017/0345064 | A1* | 11/2017 | Bauman ............. G06Q 30/0277 |
| 2018/0137546 | A1* | 5/2018 | Kang ................. G06Q 30/0277 |

OTHER PUBLICATIONS

English Abstract for DE102015115108 retrieved on Espacenet on Feb. 12, 2020.

\* cited by examiner

METHOD OF AND SERVER FOR TRANSMITTING A PERSONALIZED MESSAGE TO A USER ELECTRONIC DEVICE

CROSS-REFERENCE

The present application claims priority to Russian Patent Application No. 2017141735, filed Nov. 30, 2017, entitled "Method Of And Server For Transmitting A Personalized Message To A User Electronic Device," the entirety of which is incorporated herein by reference.

FIELD

The present technology relates to transmission of data in general, and to a method of and a system for transmitting a personalized message to a user electronic device.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The user can access the information available on the Internet by several means. The given user can access a particular resource directly, either by typing an address of the resource (typically an URL or Universal Resource Locator, such as www.webpage.com, which is a fictitious URL provided for illustration purposes only) or by clicking a link in an e-mail or in another network resource. This is particularly useful when the user knows what the resource she or he is interested in.

Alternatively, the given user may conduct a search using a search engine to locate a resource of interest. The latter is particularly suitable in those circumstances, where the given user knows a topic of interest, but does not know the exact address of the resource she is interested in. There are numerous search engines available to the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights. Irrespective of which search engine is used, the search engine is generally configured to receive a search query from a user, to perform a search and to return a ranked search engine results page (SERP) to the user.

When accessing the particular web site or conducting the search, the user can be presented with generic content or personalized content. The generic content is the content that would be shown to any user accessing the particular resource without taking into account user-specific parameters, such as user interests, user interaction history and the like. Personalized content is a type of content that is specifically personalized for the given user, based on predicted or known user interest parameters.

For example, the search result ranking can be generic (using a generic search engine result ranking algorithm) or personalized for the given user (i.e. ranked at least in part based on the information known about the given user, such as past queries, past search result interactions and the like). By the same token, a given network resource can provide generic content and personalized content to the user. Personalized content can take many forms, such as a targeted message incorporated into the content of the web site, the targeted message having been selected for the given user as a relevant message based on certain information known about the given user.

The targeted message can be provided by a provider of the generic content of the given network resource or, alternatively, it can come from a third-party source and inserted into the generic content otherwise available on the network resource.

With reference to FIG. 1, there is depicted a typical prior art system (not numbered) for delivering personalized content to a user 104 of an electronic device 102 over a communication network 106. To that end, coupled to the communication network 106 are a content provider server 108 and a personalized content provider server 110. Let it now be assumed that the user 104 is desirous of accessing a network resource 112 hosted by the content provider server 108. To that end, the electronic device 102 can execute a browser, such as a GOOGLE™ browser, a YANDEX™ browser, a SAFARI™ browser and the like. Let is also be assumed that the user 104 types in a URL address associated with the network resource 112 (such as, as an example, www.example-address.com, which is a fictitious URL provided for illustration purposes only).

In response to the user 104 attempting to access the network resource 112, the electronic device 102 generates a resource request 120 in accordance with a suitable communication protocol and transmits it, via the communication network 106, to the content provider server 108. The content provider server 108 receives the resource request 120 and determines that the network resource 112 is what the user 104 is looking for (based on the URL, for example, the process known as "address resolving"). The content provider server 108 determines that the network resource 112 contains a generic portion and a personalized portion. The content provider server 108 can further determine that the content of the generic portion is stored by the content provider server 108 and that the content for the personalized portion is stored by the personalized content provider server 110. To that end, the content provider server 108 sends a personalized content request 122 via the communication network 106 (or a separate network, as the case may be) to the personalized content provider server 110. The personalized content request 122 includes inter alia an indication of a user identifier and/or an indication of user interests associated with the user 104.

Based on the user identifier and/or the user interests, the personalized content provider server 110 selects content for the personalized content portion and transmits a personalized content portion data 124, via the communication network 106, to the content provider server 108. The personalized content portion data 124 can, for example, contain a script for embedding into the personalized portion of the network resource 112, the script, when executed on the electronic device 102, for downloading the personalized content from the personalized content provider server 110.

US patent application 2016/0063578 (published on Mar. 3, 2016 to Carasso and assigned to Adsupply Inc.) discloses an adblocking bypass system for ensuring that advertisements are loaded and presented on a user device running one or more adblockers. The adblocking bypass system is comprised of a bypass loader and a bypass proxy. The bypass loader is a component that is embedded within content publisher content. When the content publisher content is downloaded and parsed by a user device, the bypass loader executes by detecting the presence of any adblocker on the user device. If found, the bypass loader forwards any blocked advertisement calls to the bypass proxy. The bypass proxy retrieves the requested advertisements and returns them to the bypass loader which then reintroduces the advertisements in final content presentation or rendering. The bypass proxy may also modify the content publisher content by replacing any blocked advertisement calls embedded within the content with calls to the bypass proxy.

US patent application 2017/0109797 (published on Apr. 20, 2017 to Boffa et al and assigned to Akamai Technologies Inc.) discloses a server-side technique to detect and mitigate client-side content filtering, such as ad blocking. In operation, the technique operates on a server-side of a client-server communication path to provide real-time detect the existence of a client filter (e.g., an ad blocker plug-in) through transparent request exchanges, and then to mitigate (defeat) that filter through one or operations designed to modify the HTML response body or otherwise obscure URLs. Preferably, the publisher (the CDN customer) defines one or more criteria of the page resources being served by the overlay (CDN) and that need to be protected against the client-side filtering.

SUMMARY

Developers of the present technology have appreciated at least one technical problem associated with the prior art approaches to delivering personalized content to the user 104. More specifically, many browser application executed by the electronic devices 102 execute so-called content filtering applications, also known as "ad blockers". The content filtering applications are usually executed as "add-ons" to the browser application executed by the electronic device 102.

Content filtering applications are generally configured to remove or alter personalized content that is to be presented as part of the network resources 112. Typically, the content filtering applications target advertising and other commercial messages placed within the network resource 112, but are not so limited. As such, the active content filtering application can alter or remove or otherwise prevent the user 104 from accessing the personalized content on the network resource 112 that the user 104 may otherwise be interested in.

Additionally, developers of the present technology have recognized that due to the working principles of the existing ad-blocks (such as, whitelists, blacklists, filtering based on the link formats, etc.) combined with the fact that most of today's network resources have both generic and non-generic content linked and retrieved via calls, there is a risk that the ad-block will remove not only the personalized content (such as ads), but also the generic content that the network resource 112 is meant to the present to the user. Thus, developers of the present technology have recognized that execution of the ad-block software may remove the generic content of the network resource and thus "break" the presentation of the network resource 112 on the electronic device 102.

This may result in dis-satisfaction of the user 104 with either or both with the network resource 112 and the browser application that the user 104 is using.

It is an object of the present technology to ameliorate at least some of the inconveniences present in the prior art.

In accordance with a first broad aspect of the present technology, there is provided a method of sending personalized content to an electronic device associated with a user, the method executable in a personalized content system. The personalized content system including: a communication network; a network resource server hosting a network resource and accessible via the communication network; the electronic device configured to access the network resource via the communication network, a personalized content server coupled to the communication network and accessible by the network resource server and the electronic device via the communication network; the network resource having a generic content link and a personalized content link; the generic content link for accessing a generic content portion hosted by the network resource server to be displayed as part of the network resource when displayed by the electronic device and the personalized content link for accessing a personalized content portion hosted by the personalized content server to be displayed as part of the network resource when displayed by the electronic device. The method comprises: receiving, by the personalized content server, from the network resource server, a proxy-request for a network resource, the proxy-request having been generated based on a resource request for the network resource received from the electronic device; based on the proxy-request, requesting by the personalized content server from the network resource server, content of the network resource; parsing, by the personalized content server, content of the network resource, to detect a plurality of links contained therein, the plurality of links including the generic content link and the personalized content link; executing, by the personalized content server, a link obfuscation routine, the link obfuscation routine being applied to an entirety of the plurality of links such that: each link of the plurality of links is obfuscated using a pre-determined link template, the pre-determined link template being based, at least in part, based on a domain name of the network resource server; transmitting the content of the network resource with the plurality of links having been obfuscated to the electronic device.

In some implementations of the method, the method further comprises receiving, by personalized content server, from the network resource server, a content proxy-request for the network resource, the content proxy-request having been generated by the network resource server responsive to receiving a content retrieval request, which content retrieval request was generated by the electronic device in response to the plurality of links having been obfuscated by the personalized content server.

In some implementations of the method, the method further comprises executing, by the personalized content server, a link de-obfuscation routine, the link de-obfuscation routine being applied to the entirety of the plurality of links that have been obfuscated to extract de-obfuscated links, including the generic content link and the personalized content link.

In some implementations of the method, the method further comprises based on the generic content link retrieving the generic content portion and based on the personalized content link retrieving the personalized content portion; and wherein the method further comprises transmitting the generic content portion and the personalized content portion to the electronic device.

In some implementations of the method, the proxy-request comprises an indication of at least one user-parameter and wherein the indication of at least one user-parameter is used to select a particular one of the personalized content portions in response to receiving the content proxy-request.

In some implementations of the method, the proxy-request was generated by the network resource server in response to the resource request received by the network resource server containing a pre-determined processing flag.

In some implementations of the method, pre-determined processing flag was generated based on an embedded script, the embedded script having been executed as part of a previous network resource downloading from the network resource server to the electronic device.

In some implementations of the method, the embedded script is configured to detect blocking software executed by the electronic device.

In some implementations of the method, the executing the link obfuscation routine results in: the generic content link being obfuscated into an obfuscated generic content link; the personalized content link being obfuscated into an obfuscated personalized content link; and wherein both the obfuscated generic content link and the obfuscated personalized content link having the same format based on the pre-determined link template.

In some implementations of the method, the same format of both the obfuscated generic content link and the obfuscated personalized content link cause them to point, when executed by the electronic device, to the domain name of the network resource server.

In some implementations of the method, the same format has a common portion and an individualized portion, the common portion being based on the domain name and the individualized portion being based on a type of content to which an associated link is pointing to.

In some implementations of the method, the individualized portion comprises a key portion and an encoded portion, the key portion indicating a key used for obfuscating the encoded portion.

In some implementations of the method, the encoded portion comprises at least two sets of characters separated by a respective special character, the key portion indicating a type and a number of the respective special characters.

In some implementations of the method, the number of sets and the corresponding number of the respective special characters is randomly selected.

In some implementations of the method, the special characters is one of a slash and a group of alpha-numeric characters.

In some implementations of the method, the key portion is periodically changed.

In some implementations of the method, the method further comprises executing a DOM-tree obfuscating routine, the DOM-tree obfuscating routine for changing at least one of an identifier and a class associated with at least one DOM-tree element.

In some implementations of the method, the least one DOM-tree element is associated with the personalized content portion.

In some implementations of the method, the method further comprises executing an additional obfuscating routine, the additional obfuscating routine for changing at least one additional content of the network resource.

In some implementations of the method, the at least one additional content is at least one of: an image, a Cascading Style Sheet, and a JAVA-script.

In some implementations of the method, the personalized content server is configured to execute a personalized content generation routine and a proxy server routine.

In some implementations of the method, the personalized content generation routine and the proxy server routine are executed in a distributed manner, each at a dedicated server.

In accordance with another broad aspect of the present technology, there is provided a personalized content server. The personalized content server comprises: a processor; a memory, accessible by the processor, a communication interface coupled to the processor and configured for two-way communication over a communication network for communicating with: a network resource server hosting a network resource and accessible via the communication network; an electronic device configured to access the network resource via the communication network, the network resource having a generic content link and a personalized content link; the generic content link for accessing a generic content portion hosted by the network resource server to be displayed as part of the network resource when displayed by the electronic device and the personalized content link for accessing a personalized content portion hosted by the personalized content server to be displayed as part of the network resource when displayed by the electronic device. The processor is configured to: receive, from the network resource server, a proxy-request for a network resource, the proxy-request having been generated based on a resource request for the network resource received from the electronic device; based on the proxy-request, request from the network resource server, content of the network resource; parse content of the network resource to detect a plurality of links contained therein, the plurality of links including the generic content link and the personalized content link; execute a link obfuscation routine, the link obfuscation routine being applied to an entirety of the plurality of links such that: each link of the plurality of links is obfuscated using a pre-determined link template, the pre-determined link template being based, at least in part, based on a domain name of the network resource server; transmit the content of the network resource with the plurality of links having been obfuscated to the electronic device.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as a electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "relevance factor of the search query result set" shall mean the likelihood that the user submitting the search query was intending to see data maintained within the search query result set.

In the context of the present specification, the expression "component" is meant to include software (appropriate to a particular hardware context) that is both necessary and sufficient to achieve the specific function(s) being referenced.

In the context of the present specification, the expression a "search query result set" is a listing of results returned by a search engine, which may encompass one or more general or specialized search modules, in response to a search query. Search query result set may contain a listing of results returned by a web search module, or by one or more vertical search modules, or by combination of results returned by web module and one or more vertical modules. The search query result set may also contain no results.

In the context of the present specification, the expression a "search engine result page" is a listing of results to be displayed to a client on an electronic device, the listing generated by combining a search query result set with targeted messages.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
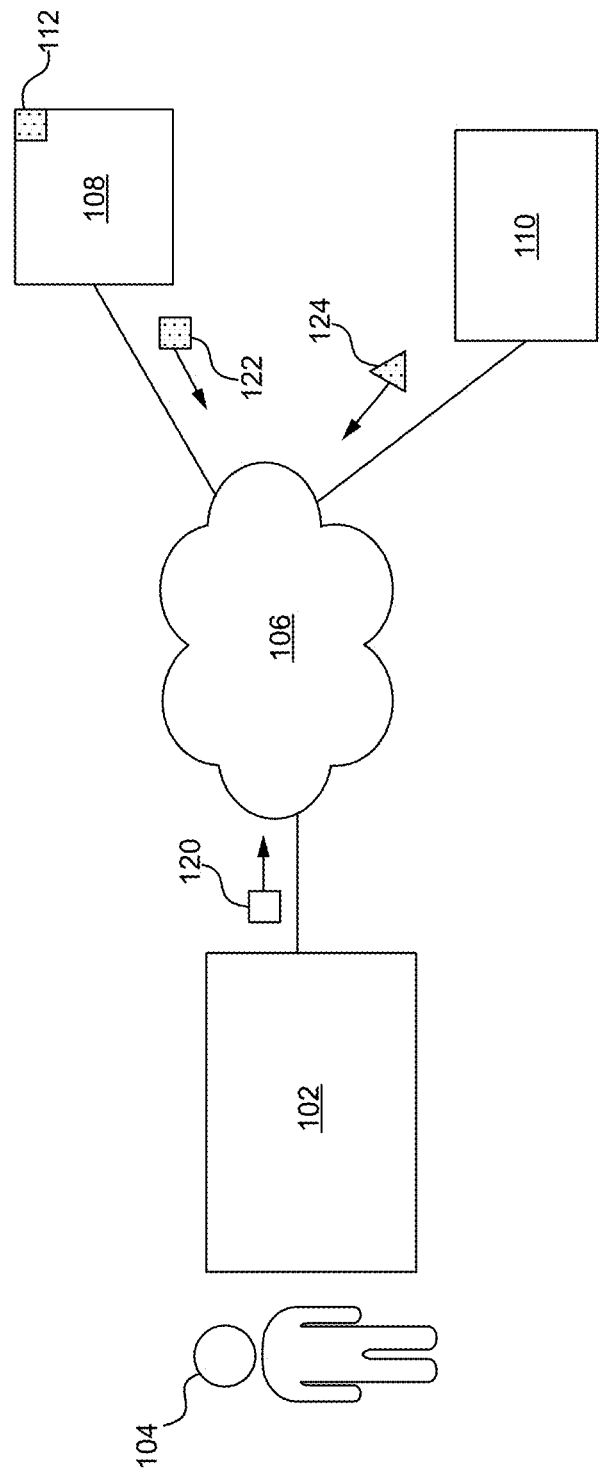
FIG. 1 is an illustration of a prior art system for delivering personalized content to an electronic device.
Figure 2:
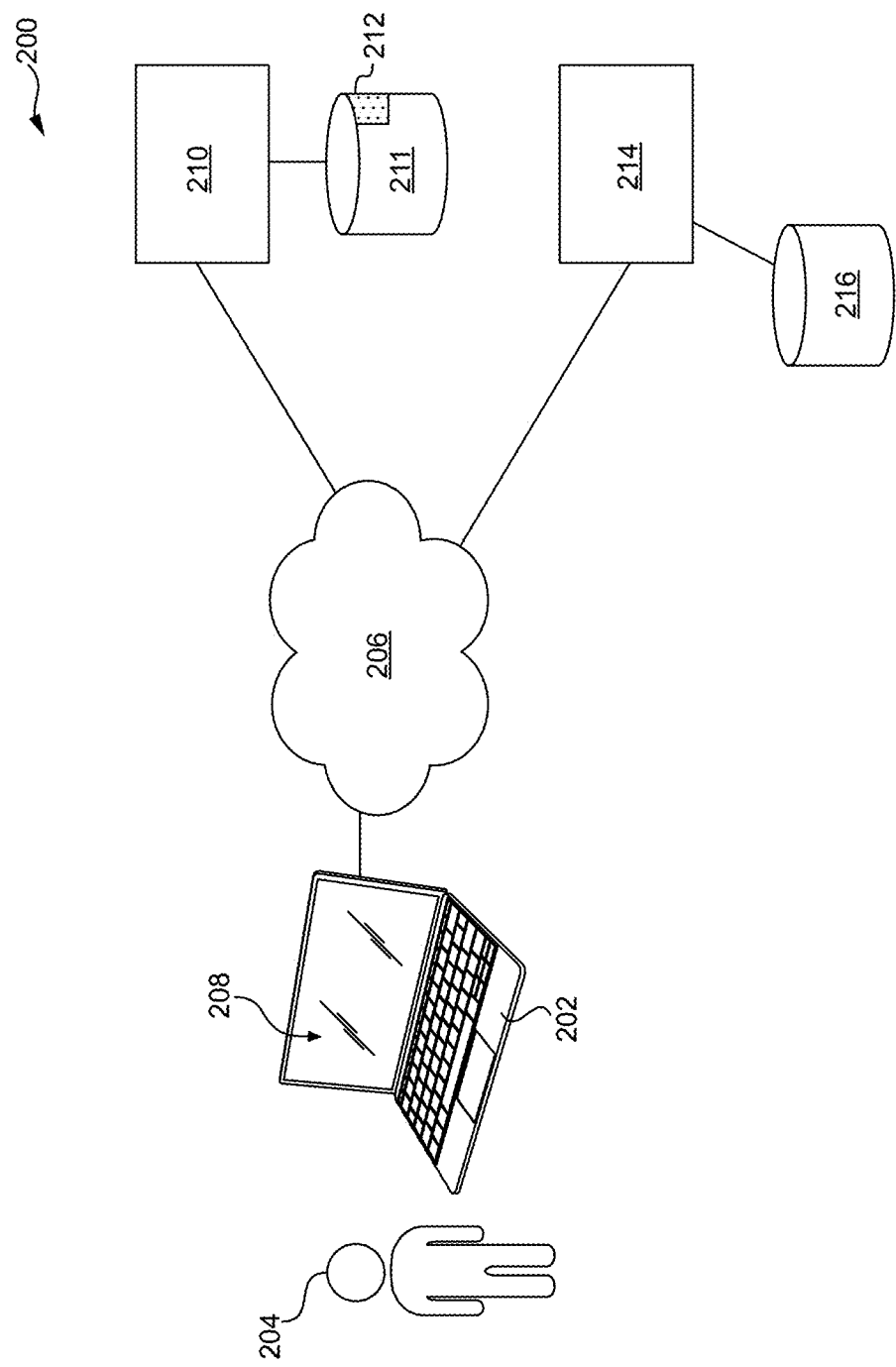
FIG. 2 depicts a diagram of a system implemented in accordance with non-limiting embodiments of the present technology.

Referring to FIG. 2, there is depicted a diagram of a system 200, the system 200 being implemented in accordance with non-limiting embodiments of the present technology. It is to be expressly understood that the system 200 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 200 may provide in certain instances a simple implementation of the present technology, and that where such is the case they have been presented in this manner as an aid to understanding. As persons skilled in the art would understand, various implementations of the present technology may be of a greater complexity.

FIG. 2 illustrates the system 200 in accordance with one non-limiting embodiment of the present technology. The system 200 comprises an electronic device 202. The electronic device 202 is typically associated with a user 204 and, as such, can sometimes be referred to as a "client device". It should be noted that the fact that the electronic device 202 is associated with the user does not need to suggest or imply any mode of operation—such as a need to log in, a need to be registered or the like. Naturally, the system 200 can have a plurality of electronic devices similar or different from the electronic device 202.

The implementation of the electronic device 202 is not particularly limited, but as an example, the electronic device 202 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 202 is known in the art and, as such, will not be described here at much length. Suffice it to say that the electronic device 202 comprises a user input interface (such as a keyboard, a mouse, a touch pad, a touch screen and the like) for receiving user inputs; a user output interface (such as a screen, a touch screen, a printer and the like) for providing visual or audible outputs to the user 204; a network communication interface (such as a modem, a network card and the like) for two-way communication over a communication network 206; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The electronic device 202 comprises hardware and/or software and/or firmware (or a combination thereof) that enable the electronic device 202 to execute a browser application 208. Generally speaking, the purpose of the browser application 208 is to enable the user 204 to access one or more network resources via the communication network 206, such as a network resource 212 hosted by a network resource server 210.

Furthermore, the system 200 comprises the above-mentioned communication network 206. In some non-limiting embodiments of the present technology, the communication network 206 can be implemented as the Internet. In other embodiments of the present technology, the communication network 206 can be implemented differently, such as any wide-area communications network, local-area communications network, a private communications network and the like.

The system 200 further comprises the above-mentioned network resource server 210 coupled to the communication network 206 via a communication link (not separately numbered). The network resource server 210 can be implemented as a conventional computer server. In an example of an embodiment of the present technology, the network resource server 210 can be implemented as a Dell™ PowerEdge™ Server running the Microsoft™ Windows Server™ operating system. Needless to say, the network resource server 210 can be implemented in any other suitable hardware and/or software and/or firmware or a combination thereof. In the depicted non-limiting embodiment of present technology, the network resource server 210 is a single server. In alternative non-limiting embodiments of the present technology, the functionality of the network resource server 210 may be distributed and may be implemented via multiple servers.

The implementation of the network resource server 210 is well known. However, briefly speaking, the network resource server 210 comprises a communication interface (not depicted) structured and configured to communicate with various entities (such as the electronic device 102, for example and other devices potentially coupled to the communication network 206) via the communication network 206. The network resource server 210 further comprises at least one computer processor (not depicted) operationally connected with the communication interface and structured and configured to execute various processes to be described herein.

In some non-limiting embodiments, the network resource server 210 could be implemented by a cloud-based server system, which could be a combination of virtual servers and storage and/or physical infrastructure servers and storage.

The network resource server 210 is configured to provide access to a plurality of network resources, one of which, the network resource 212 is depicted in FIG. 2. The network resource 212 can be accessed by the user 204 using the electronic device 202 in a number of ways, such as by entering an URL associated with the network resource 212 into the browser application 208 executed by the electronic device 202, by clicking a link (such as one in an e-mail, another network resource or on a search engine result page) directed to the network resource 212 or by any other suitable means.

The network resource 212 can be a web site, a web portal, a search result page, or the like. With brief reference to FIG. 3, the network resource 212 (when rendered by the electronic device 202, as an example) has a generic content portion 302 and a personalized content portion 304 (or multiples thereof). The generic content portion 302 comprises content that that would be shown to any user accessing the network resource 212 without taking into account user-specific parameters, such as user interests, user interaction history and the like. Personalized content portion 304 comprises content that is specifically personalized (i.e. selected) for the given user (such as the user 204), based on predicted or known user interest parameters.

For example, for a newspaper portal (such as that of CNN™ news, BBC™ news and the like) being the network resource 212, the generic content portion 302 can contain top news that would be shown to any user accessing the newspaper portal, while the personalized content portion 304 can include news associated with a specific topic of interest for the user 204 (i.e. the personalized content portion 304 can have a selection of news specifically selected for a given user, such as the user 204. By the same token, the personalized content portion 304, in the same newspaper portal example, can include a targeted messaged, such as an ad that is specifically selected for the user 204.

Figure 3:
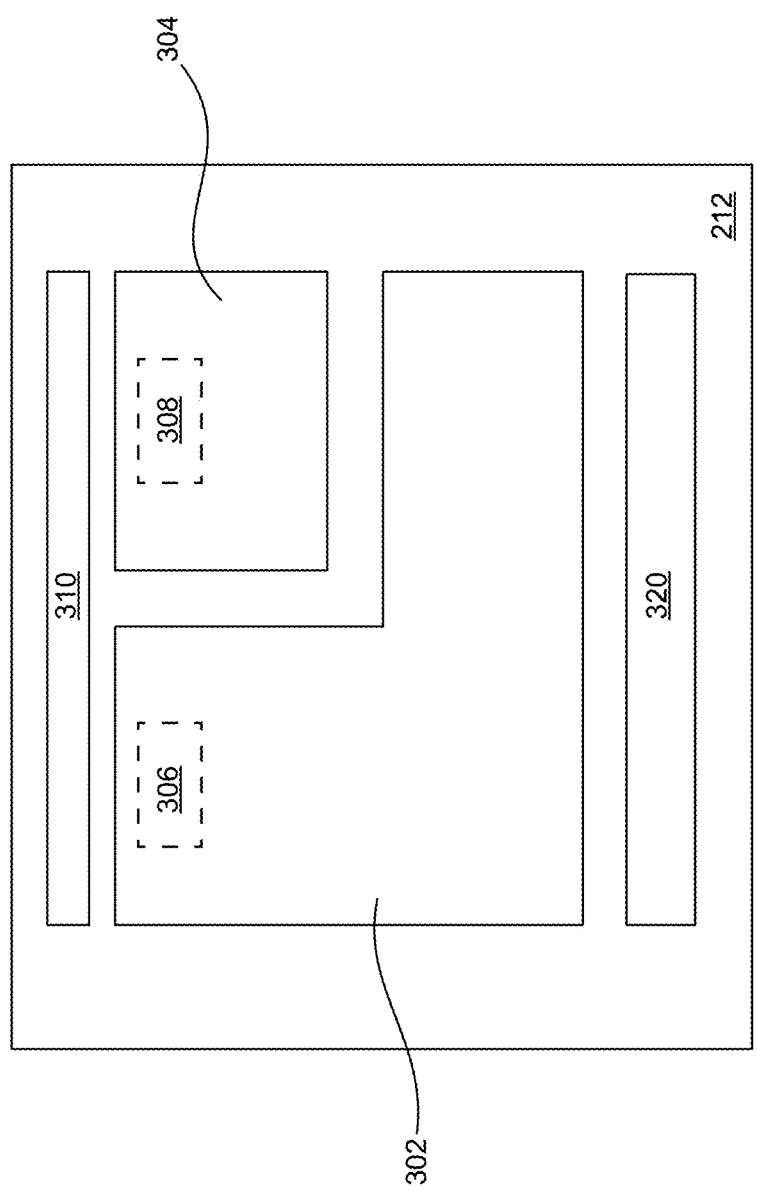
FIG. 3 depicts an illustration of a network resource that has a generic content portion and a personalized content portion, the network resource being accessible within the system of FIG. 2.

Even though the illustration of FIG. 3 schematically shows a single instance of the generic content portion 302 and a single instance of the personalized content portion 304, this needs not be so in every embodiment of the present technology. As such, it is contemplated that the given network resource 212 can have one or more instances of the generic content portion 302 and one or more instances of the personalized content portion 304. It should also be noted that the placement of the one or more instances of the generic content portion 302 and one or more instances of the personalized content portion 304 is not particularly limited.

In some embodiments, some or all of the personalized content portion 304 can be visually distinguished from one or more instances of one or more instances of the generic content portion 302. In these embodiments, any one of the personalized content portion 304 can be located above, below, to the right or to the left of any one or more instances of one or more instances of the generic content portion 302. In some of these embodiments, any one of the personalized content portion 304 can be located in-between any two of the one or more instances of one or more instances of the generic content portion 302 (but still be visually distinguishable—such as by a different appearance, font, color, border or the like).

In other embodiments, some or all of the personalized content portion 304 can be visually non-distinguishable from one or more instances of one or more instances of the generic content portion 302. In these embodiments, any one of the personalized content portion 304 can be located in-between any two of the one or more instances of one or more instances of the generic content portion. This is a particularly applicable approach for those embodiments (without being so limited) where the network resource 212 is a search engine result page and the generic content portion 302 presents search results ranked in accordance with a generic ranking algorithm, while the personalized content portion 304 presents search results that are ranked in accordance with user-personalized ranking algorithm.

In some embodiments of the present technology, some of the content of the generic content portion 302 and/or of the personalized content portion 304 can be "embedded" into the encoding of the network resource 212 (such, as for example, into the Hypertext Markup Language (HTML) of the network resource 212). In other embodiments of the present technology, some or all of the content of the generic content portion 302 and/or of the personalized content portion 304 can be hosted by respective hosts and the HTML of the network resource 212 may contain a link embedded thereto, which link triggers downloading of the associated content from its respective host, when the HTML of the network resource 212 is processed and rendered by the electronic device 202.

To that end, the network resource 212 can have an indication of a first link 306 and a second link 308. The first link 306 (which can be thought of as a "generic content link" 306) for accessing content of the generic content portion 302 of the network resource 212 hosted by the network resource server 210 to be displayed as part of the network resource 212 when displayed by the electronic device 202. The second link 308 (which can be thought of as a "personalized content link" 308) for accessing content of the personalized content portion 304 hosted by a personalized content server 214 to be displayed as part of the network resource 212 when displayed by the electronic device 202. It is noted that the second link 308 does not need to point to a specific content hosted by the personalized content server 214, rather the second link 308 is configured to trigger a "call" to the personalized content server 214, the call for causing the personalized content server 214 to select a specific personalized content based on a selection criteria and to return the so-selected personalized content for displaying by the browser application 208. The process for selecting the personalized content will be described in greater detail herein below.

Even though FIG. 3 depicts only a single instance of the first link 306 (and a single instance of the second link 308), this does not need to be so in every embodiment of the present technology. As such, the network resource 212 can contain a plurality of instances of the first link 306 (and a plurality of instances of the second link 308). For example, the a given example of the network resource 212 can have several portions of the generic content (such as several images, several text boxes, several embedded videos, or the like). In this example, each one (or a group of) of the generic content portions can have a dedicated instance of the first link 306. Same applies mutatis mutandis to the second link 308 and the personalized content.

The network resource 212 can also contain at least one additional content item 310. The at least one content item 310 can include one or more support content items for facilitating process and displaying of the content of the network resource 212 by the electronic device 202. Examples of such additional content items can be one or more of: an image, a Cascading Style Sheet (CSS), a JAVA-script and the like.

The network resource 212 can also have, embedded therein (i.e. into the code of the network resource) an applet 320. The applet 320 can be implemented as an Application Programming Interface (API), as a script, or the like. The functionality of the applet 320 will be described in greater detail herein below.

Returning to the description of FIG. 2, in accordance with the non-limiting embodiments of the present technology, the content of the generic content portion 302 is hosted by the network resource server 210 and, more particularly, is stored at a generic content database 211, the generic content database 211 being either accessible by the network resource server 210 or, alternatively, is implemented as part of the network resource server 210.

Figure 4:
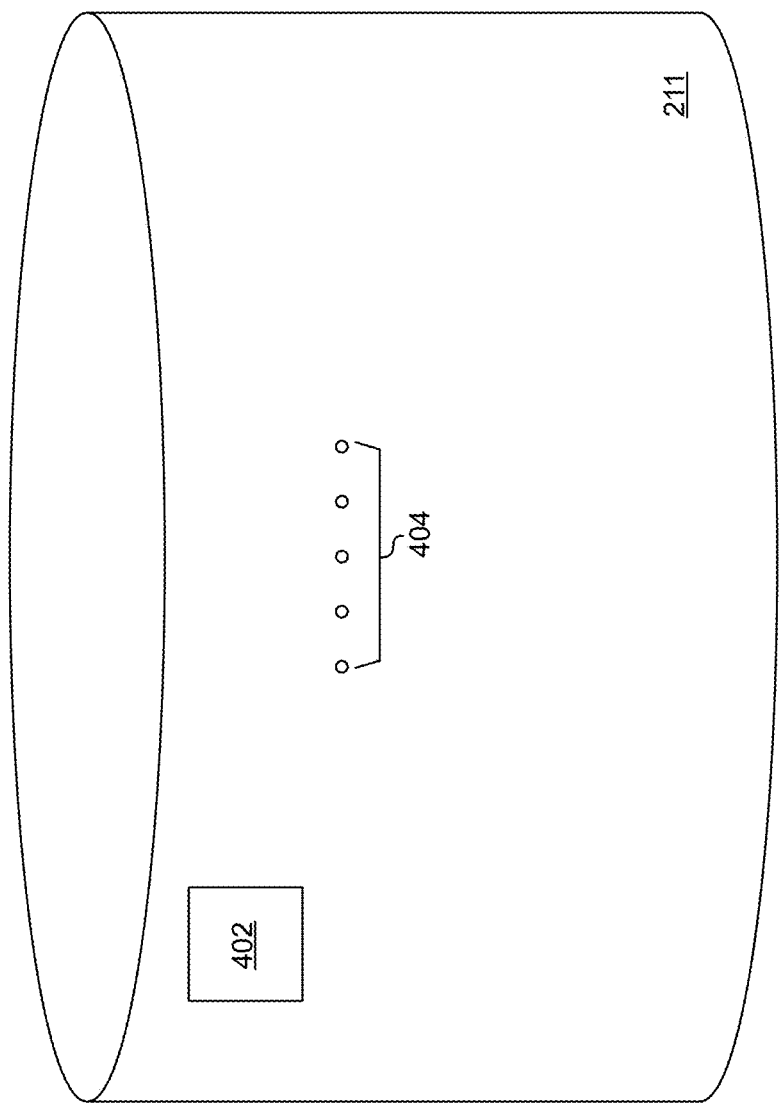
FIG. 4 depicted a non-limiting embodiment of a generic content database implemented in accordance with non-limiting embodiments of the present technology, the generic content database being part of the system of FIG. 2.

With reference to FIG. 4, there is depicted a non-limiting embodiment of the generic content database 211 implemented in accordance with non-limiting embodiments of the present technology. The generic content database 211 stores the content for the generic content portion 302, depicted in FIG. 4 at 402. The generic content database 211 also stores content for a plurality of additional network resources, the content depicted in FIG. 4 at 404. The generic content depicted at 404 can be generic content for other pages within the network resource 212 (the network resource 212 being a web site or web portal) or it can be generic content for other network resource(s) stored by the network resource server 210, similar or different from the network resource 212.

The content stored in the generic content database 211 can be individually addressable (i.e. retrievable) by the network resource server 210 using a unique content identifier (such as a Universal Resource Identifier or URI for short, a numeric content identifier or the like), an indication of which can be provisioned as part of the first link 306.

With continued reference to FIG. 2, the system 200 further comprises the above-mentioned personalized content server 214 coupled to the communication network 206 via a communication link (not separately numbered). The personalized content server 214 can be implemented as a conventional computer server. In an example of an embodiment of the present technology, the personalized content server 214 can be implemented as a Dell™ PowerEdge™ Server running the Microsoft™ Windows Server™ operating system.

Needless to say, the personalized content server 214 can be implemented in any other suitable hardware and/or software and/or firmware or a combination thereof. In the depicted non-limiting embodiment of present technology, the personalized content server 214 is a single server. In alternative non-limiting embodiments of the present technology, the functionality of the personalized content server 214 may be distributed and may be implemented via multiple servers.

In some non-limiting embodiments of the present technology, the personalized content server 214 can be under control and/or management of an entity providing personalized content. In a specific non-limiting embodiment, the personalized content server 214 can be under control and/or management of search engine.

The implementation of the personalized content server 214 is well known. However, briefly speaking, the personalized content server 214 comprises a communication interface (not depicted) structured and configured to communicate with various entities (such as the electronic device 102, for example and other devices potentially coupled to the communication network 206) via the communication network 206. The personalized content server 214 further comprises at least one computer processor (not depicted) operationally connected with the communication interface and structured and configured to execute various processes to be described herein.

Figure 5:
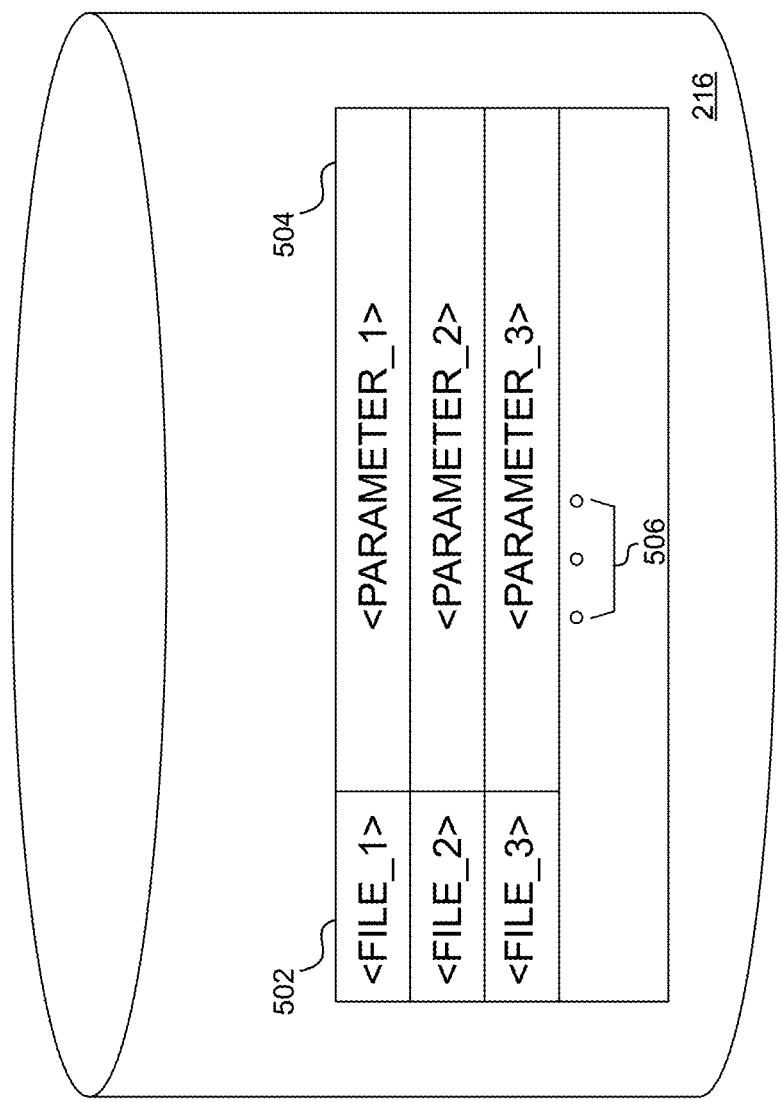
FIG. 5 depicts a non-limiting embodiment of a personalized content database implemented in accordance with non-limiting embodiments of the present technology, the personalized content database being part of the system of FIG. 2.

As depicted in FIG. 2, the personalized content server 214 has access to a personalized content database 216. The content of the personalized content portion 304 is stored in the personalized content database 216. With reference to FIG. 5, there is depicted a non-limiting embodiment of the personalized content database 216 implemented in accordance with non-limiting embodiments of the present technology. The personalized content database 216 stores a plurality of possible contents for selection and inclusion into the personalized content portion 304 (the personalized content portion 304 being selected for a specific user or a group of users to whom the personalized content portion 304 is destined to).

As such, the personalized content database 216 maps an indication of a stored personalized content 502 with a selection parameter 504, associated respectively with the given one of the stored personalized content 502. The selection parameter 504 stores an indication of one or more descriptors that describe the potential audience (such as the user 204 or other users similar or different from the user 204) for whom the associated stored personalized content 502 is aimed for.

For example, the selection parameter 504 can identify one or more of: gender, social-economic status, age bracket, income bracket, general interest parameters (such as, for example: cars, sports, collectibles, famous artists and the like), time of the day when the personalized content should be shown, geographical region where the personalized content should be shown and the like.

In the depiction of FIG. 5, the personalized content with an identifier <file_1> is associated with <Parameter_1>, the personalized content with an identifier <file_2> is associated with <Parameter_2> and the personalized content with an identifier <file_3> is associated with <Parameter_3>. The personalized content database 216 can further store a number of additional possible content choices for the personalized content portion 304 jointly depicted at 506.

It should be apparent that even though the stored personalized content 502 is described as "personalized" for a given one of the user 204, that does not need to imply that the given instance of the stored personalized content 502 will be selected exclusively for a single one of a plurality of users (including the user 204).

To the contrary, the stored personalized content 502 can be selected for the user 204 (based on certain parameters, as will be described below), as well as for another user, who can for example have similar interests to those of the user 204. Just as an example, let it be assumed that the stored personalized content 502 is a selection of tops news associated with category "Sports". Let it also be assumed that a prior browsing activity of the user 204 indicated that the user 204 has a particular keen interest in sports and, as such, based on the selection parameter 504, the given stored personalized content 502 can be selected for the user 204. However, if another user (not depicted) is also determined to be associated to have keen interest in sports, the same given stored personalized content 502 can be selected for the other user as well.

The content stored in the personalized content database 216 can be individually addressable (i.e. retrievable) by the network resource server 210 and/or by the electronic device 102 by a unique content identifier (such as a URL, a numeric content identifier or the like), which in some embodiments can be the same as the indication of a stored personalized content 502. This address can be used at least in part for generating the second link 308.

Figure 6:
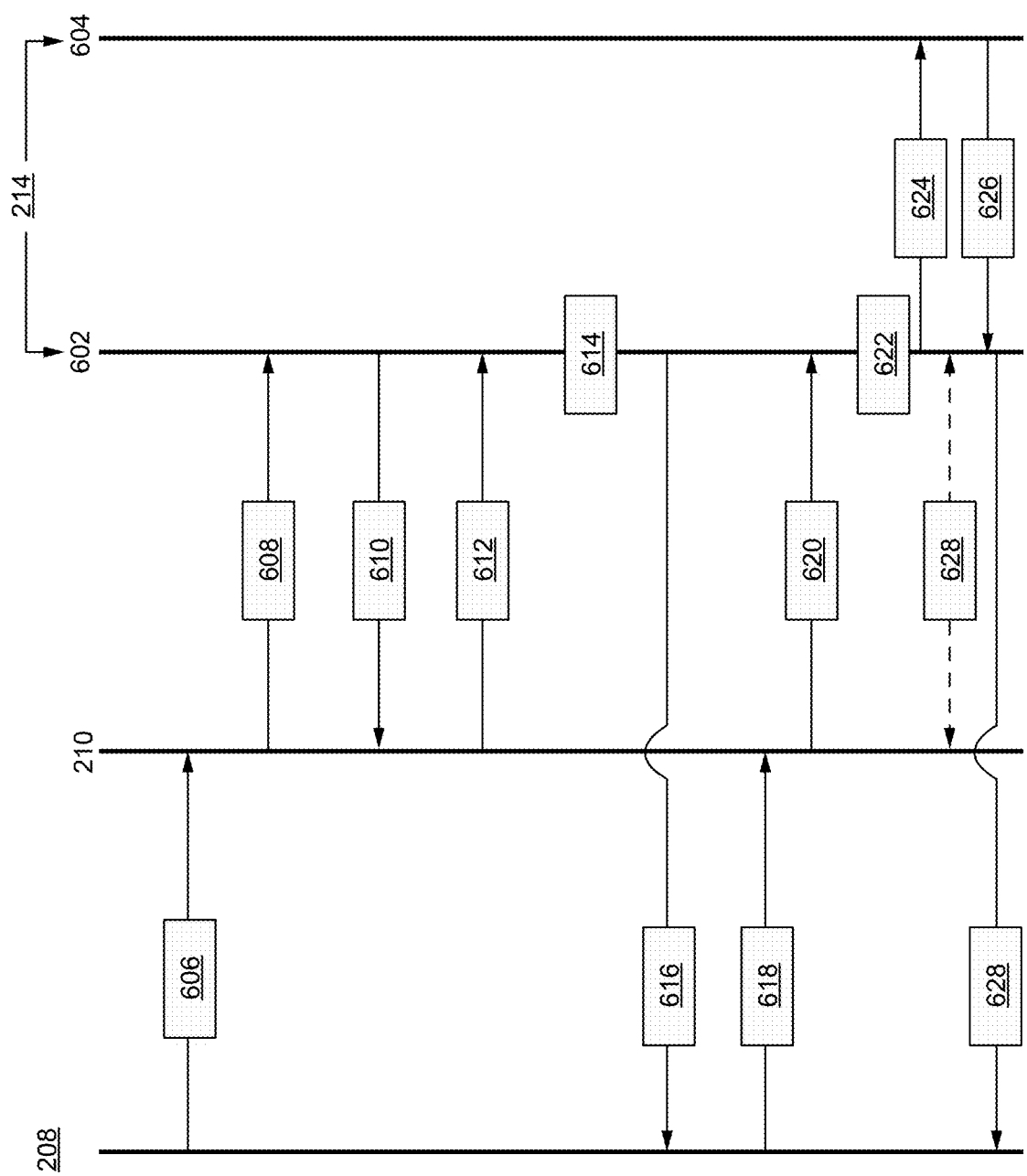
FIG. 6 depicts a signal flow diagram between various component of the system of FIG. 2, the signal flows being implemented in accordance to some non-limiting embodiments of the present technology.

With reference to FIG. 6, there is depicted a signal flow diagram depicting flow of information between the various components of the system 200 during the execution of the methods in accordance with the non-limiting embodiments of the present technology. More specifically, FIG. 6 depicts the browser application 208 executed by the electronic device 202, the network resource server 210 and the personalized content server 214.

In a specific non-limiting embodiment of the present technology that is depicted in FIG. 6, the personalized content server 214 executes two sub-routines—a proxy server routine 602 and personalized content generation routine 604. In various embodiments of the present technology, the personalized content generation routine 604 and the proxy server routine 602 can be executed as software routine by a single server (i.e. the personalized content server 214). In other embodiments of the present technology, the personalized content generation routine 604 and a proxy server routine 602 can each be executed by a dedicated server.

As part of a signal flow 606, the browser application 208 transmits a content request to the network resource server 210. The content request depicted as part of the signal flow 606, can be generated by the browser application 208 in response to the user interaction with the browser application 208 (such, as for example, user typing in a URL associated with the network resource 212 hosted by the network resource server 210, the user clicking on a link to the network resource 212 from an email, another network resource, a chat or the like). The content request depicted as part of the signal flow 606, can be generated by the browser application 208 without the user interaction with the browser application 208 (for example, in response to the browser application 208 executing a link to the network resource 212 by itself or the like).

In accordance with non-limiting embodiments of the present technology, the network resource server 210 analyzes the content of the content request received as part of the signal flow 606. In some embodiments of the present technology, the network resource server 210 analyzes the content of the content request received as part of the signal flow 606 for presence of a pre-determined processing flag. In some embodiments of the present technology, the content request received as part of the signal flow 606 may contain a user identifier (such as a "user cookie" associated with the electronic device 202 and pre-assigned by the network resource server 210, or the like) identifying the requester associated with the content request (the identification may be through one or both of an identity of a user and identity of the electronic device 202).

In some embodiments of the present technology, the pre-determined processing flag is generated by the above mentioned applet 320 of a previous network resource loaded to the electronic device 202 in response to a pre-determined condition. In some embodiments of the present technology, the pre-determined condition is execution by the browser application 208 an ad-block software. For example, in response to the previous network resource that has been downloaded to the electronic device 202 having detected the presence of the ad-block software (for example, by executing the applet 320), the applet 320 may have provisioned the user cookie with an indication of the pre-determined processing flag.

In a specific non-limiting example, the applet 320 can be executed as a Detect (JAVA-Script based applet) and the pre-determined processing flag can be a value thereof (adb=1) indicative of the browser application 208 executing the ad-blocking software, for example. Naturally, other types and implementations for the applet 320 and the pre-determined processing flag can be used without departing from the scope of the present technology.

In response to the network resource server 210 determining that the content of the content request received as part of the signal flow 606 contains a pre-determined processing flag, the network resource server 210 generates a signal flow 608 destined to the proxy server routine 602 executed by the personalized content server 214.

The signal flow 608 contains a proxy-request for the network resource 212, the proxy-request "mimicking" the content request received as part of the signal flow 606. By sending the signal flow 608 to the proxy server routine 602, the network resource server 210, in a sense, mimics the request of the network resource 212.

It is noted that the network resource server 210 determines that it is the proxy server routine 602 of the personalized content server 214 that needs to be destination of the signal flow 608 based on the fact that the personalized content portion 304 of the requested network resource 212 is associated with the personalized content server 214. Such association may be stored in an internal memory (not depicted) or another database maintained by the network resource server 210.

In response to receiving the signal flow 608, the proxy server routine 602 processes the proxy-request contained therein. In some embodiments, the proxy server routine 602 optionally removes the pre-determined processing flag from the proxy-request. The proxy server routine 602 then generates a signal flow 610 destined towards the network resource server 210, the signal flow 610 containing a content request for the network resource 212.

In response to the receipt of the signal flow 610, the network resource server 210 generates a signal flow 612 containing the content of the requested network resource 212 (for example, in a form of the HTML file) and send the signal flow 612 to the proxy server routine 602 of the personalized content server 214.

In some embodiments of the present technology, the signal flows 610 and 612 can be omitted, and the proxy server routine 602 of the personalized content server 214 can receive the content of the requested network resource 212 as part of the signal flow 208.

As part of the signal flow 612, the proxy server routine 602 of the personalized content server 214 receives the content of the requested network resource 212 and, more specifically, an indication of a plurality of links contained in the network resource 212 (including the first link 306 and the second link 308).

The proxy server routine 602 of the personalized content server 214 parses the received content of the signal flow 612 to extract the plurality of links contained in the network resource 212 (including the first link 306 and the second link 308). The proxy server routine 602 of the personalized content server 214 then executes a link obfuscation routine, depicted in FIG. 6, at 614.

As part of the link obfuscation routine 614, the proxy server routine 602 of the personalized content server 214 obfuscates each one (and all) of the plurality of links contained in the network resource 212 (including the first link 306 and the second link 308). More specifically, the proxy server routine 602 of the personalized content server 214 obfuscates each link of the plurality of links contained in the network resource 212 (including the first link 306 and the second link 308) using a pre-determined link template, the pre-determined link template being based, at least in part, based on a domain name of the network resource server 210.

To that end, the link obfuscation routine 614 extracts the content of the first link 306 and the second link 308 (i.e. the URLs) and obfuscates them into obfuscated links using the pre-determined link template. Let it be assumed that the first link 306 is https:\\resource.net\page_1. As a non-limiting example, the link obfuscation routine 614 may obfuscate the first link 306 into an obfuscate first link using the pre-determined link template and the resultant obfuscated first link may be:

domain.com/40bcYAKy5/u1reoCQ_WVV/ J90tH8w7Qgq5hZ27/3uHn9PLoH

Figure 7:
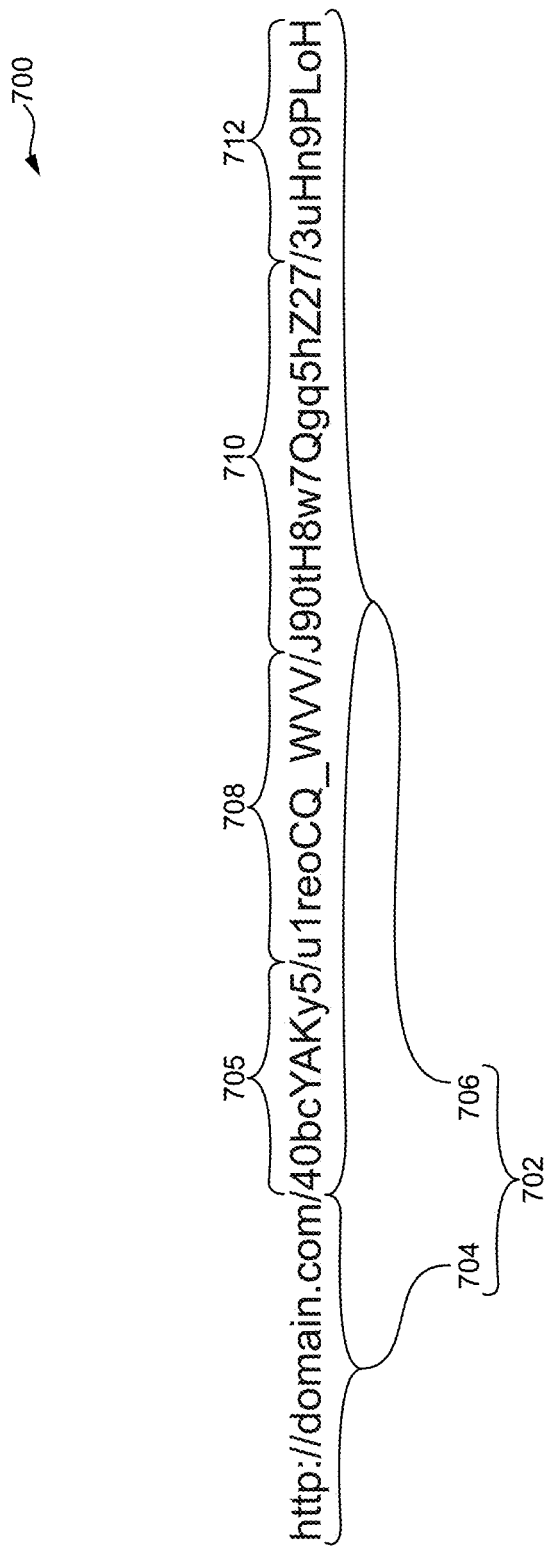
FIG. 7 depicts a schematic illustration of a structure of an obfuscated link implemented in accordance with some non-limiting embodiments of the present technology.

With reference to FIG. 7, there is depicted a non-limiting example of an obfuscated link 700. The obfuscated link 700 is based on the pre-determined link template 702.

In the depicted example, the pre-determined link template 702 comprises two portions—a first portion 704 (based on the domain name) and a second portion 706. The first portion 704 can be thought of as a "common portion" and it can be the same for all of the plurality of links that originate from the same network resource server 210.

The second portion 706 can be thought of as an "individualized portion" and is generated based on the content of the original link. In the depicted example, the second portion 706 contains a key portion 705 and three encoded portions—a first encoded portion 708, a second encoded portion 710, and a third encoded portion 712; all three encoded portion separated by a slash sign "I").

The key portion 705 contains a "key" that was used for encrypting the first encoded portion 708, the second encoded portion 710, and the third encoded portion 712. In the depicted example, the key portion 705 contains the information as to the number of instances of the encoded portions (i.e. three instances, the first encoded portion 708, the second encoded portion 710, and the third encoded portion 712), as well as the special character that was used for separating the first encoded portion 708, the second encoded portion 710, and the third encoded portion 712 (in this example, the special character being the slash "l").

The combination of characters in the second portion 706, in a sense, "encrypt" or "encode" the associated link. It is noted that the obfuscated link template 700 is based (at least in part) on the domain name associated with the network resource server 210 (namely the first portion 704 that is based on, or in other words, includes the domain name or a portion thereof of the network resource server 210). It is also noted that the obfuscated link template 700 is applied to the totality of the links associated with the network resource 212.

Therefore, as an illustration only, the entirety of the plurality of links are obfuscated by the link obfuscation routine 614. The code portion below illustrates the totality of links before the execution of the link obfuscation routine 614:

```
<script src="/scripts/main/gallery.js"></script>
<script src="https://an.yandex.ru/system/context.js"></script>
<script src="https://yastatic.net/pcode/adfox/loader.js"></script>
<div class="promo" style="width: 240px; height: 400px; ">
<img src="http://domain.com/img/promo/1.jpeg" alt="promo pic" itemprop="image"/>
</div>
```

The code portion below illustrates the totality of links after the execution of the link obfuscation routine 614:

```
<script src=" https://domain.com/jfjd8e/JDhd834/Kdkdoisn/87dhHKJd"></script>
<script src="
https://domain.com/40bcYAKy5/u1reoCQ_WVV/J90tHw7Qgq5hZ27/3uHn9PLoH">
</script>
<script src=" https://domain.com/dfjIJdjud/55gddf/KJd98jHF/ffghr4Dfgrr"> </script>
<div class="a64fee93ac" style="width: calc(218px+22px); height: calc(390px+10px);">
    <img src="http://domain.com/KDL8547fH/fgdd5/KK0Ijfjdeyy47/RhfdtwLthhb6"
alt="promo pic" itemprop="image"/>
</div>
```

The proxy server routine 602 of the personalized content server 214 generates a signal flow 616, the signal flow 616 containing the network resource 212 with the plurality of obfuscated links. The proxy server routine 602 of the personalized content server 214 then transmits the signal flow 616 to the browser application 208 of the electronic device 202.

The browser application 208 receives the signal flow 616 and retrieves the network resource 212. The browser application 208 starts to process the content of the network resource 212. When the browser application 208 encounters an obfuscated link, it generates a respective signal flow 618 to the network resource server 210 (recalling that the obfuscated links are based at least in part on the domain name of the network resource server 210), the respective signal flow 618 being a "call" for content based on the respective obfuscated link.

When the network resource server 210 receives the respective signal flow 618 and based, for example, on the user cookie contained therein, the network resource server 210 generates a signal flow 620, the signal flow 620 containing a content proxy-request for the network resource 212. Thus, it can be said that the signal flow 620 is generated by the network resource server 210 responsive to receiving a content retrieval request (as part of the signal flow 618), which content retrieval request was generated by the electronic device 202 in response to processing of the plurality of links having been obfuscated by the personalized content server 214.

When the proxy server routine 602 receives the signal flow 620, the proxy server routine 602 executes a link de-obfuscation routine 622, the link de-obfuscation routine 622 being applied to the respective signal flow 618 (as part of applying the link de-obfuscation routine 622 to the entirety of the plurality of links that have been obfuscated to extract de-obfuscated links, including the generic content link and the personalized content link).

The processing of the de-obfuscated link depends on the content of the de-obfuscated link.

Respective Signal Flow 618 is for a Personalized Content Portion 304

In this scenario, based on the de-obfuscated link(s), the proxy server routine 602 generates a signal flow 624, the signal flow 624 containing a request for personalized content portion based on the de-obfuscated personalized content link. The proxy server routine 602 transmits the signal flow 624 to the personalized content generation routine 604. The personalized content generation routine 604 selects the personalized content portion 304 (as will be described in greater detail herein below) and generates a signal flow 626, the signal flow 626 containing the so-selected personalized content portion 304 and transmits the signal flow 626 to the proxy server routine 602.

Respective Signal Flow 618 is for a Generic Content Portion 303

In this scenario, the proxy server routine 602 generates a signal flow 628 to the network resource server 210, the signal flow 628 containing a request for the generic content portion 302 based on the obfuscated generic content link. As part of the signal flow 628, the network resource server 210 returns the so-requested generic content portion 302. It is noted that the signal flow 628 can be optional. For example, in alternative non-limiting embodiments of the present technology, the content of the generic content portion 302 can be transmitted as part of the signal flow 620. It is noted that even though the signal flow 620 is depicted as a single two-way flow, it can also be implemented as the other signal flows depicted above.

It is also noted that the proxy server routine 602 can generate several instances of the signal flow 624 and 628, depending on the number of links contained in the network resource 212.

The proxy server routine 602 then generates a signal flow 628, the signal flow 628 for transmitting the generic content portion 302 and the personalized content portion 304 to the electronic device 202. The signal flow 628 provides the content of the generic content portion 302 and the personalized content portion 304 for display by the browser application 208.

Selection of the Personalized Content

Now, we will turn our attention to how the personalized content generation routine 604 of the personalized content server 214 selects the given one of the stored personalized content 502. In accordance with the embodiments of the present technology, the personalized content generation routine 604 of the personalized content server 214 is configured to select a particular one of the stored personalized content 502 based at least in part on at least a portion of a personalization data associated with the user associated with the electronic device 202 (i.e. the user 204). The personalization data can include at least one of: (i) browsing history, (ii) a list of application installed on the electronic device, (iii) usage information associated with at least one of the applications installed on the electronic device, and (iv) geo-information associated with the electronic device, the geo-information being at least one of historic and current. Naturally, the personalization data can be implemented in a number additional ways.

The at least the portion of the personalization data can be obtained, by the personalized content generation routine 604 of the personalized content server 214 in a number of ways (and naturally, this can be done at a point of time prior to executing the selection of the given one of the stored personalized content 502). In a specific embodiment of the present technology, the personalized content generation routine 604 of the personalized content server 214 can obtain the at least the portion of the browsing history from the electronic device 202. For example, recalling that the electronic device 202 executes the browser application 208 (the browser application 208 for enabling the user 204 to access the network resource 212), the browsing history can be compiled, at least in part, by the browser application 208.

Alternatively, the at least the portion of the browsing history can be obtained by the personalized content server 214 by incorporating a tracking applet (not depicted) into one or more resources that have been visited by the user 204 of the electronic device 202. One example of such the tracking applet is Yandex.Metrika™. Another example of such the tracking application is Google™ Analytical (Premium) product. Naturally, a combination of these two approaches and/or other approaches can be used by the personalized content server 214 to determine the browsing history associated with the user 204.

It should be also understood that even though the description presented here uses the browsing history (or personalization information in general) as a proxy for determining user interests, the personalized content generation routine 604 of the personalized content server 214 can use other information for determining user interest. For example, in an alternative embodiments, the user 204 can expressly provision her or his interest (for example, by visiting a provisioning web portal associated with the personalized content server 214). In yet further embodiments, the personalized content server 214 can employ other information for determining user interests.

In alternative embodiments of the present technology, the personalized content generation routine 604 of the personalized content server 214 transmits, in addition to the so-selected stored personalized content 502, an indication of the requirements of how the so-selected stored personalized content 502 is to be incorporated into the personalized content portion 304. For example, in those embodiments, where the network resource 212 is encoded in HTML, the indication of the requirements can be sent in form of an additional HTML code that is to be inserted into the HTML code of the network resource 212 such the so-selected stored personalized content 502 is inserted into the personalized content portion 304.

Figure 9:
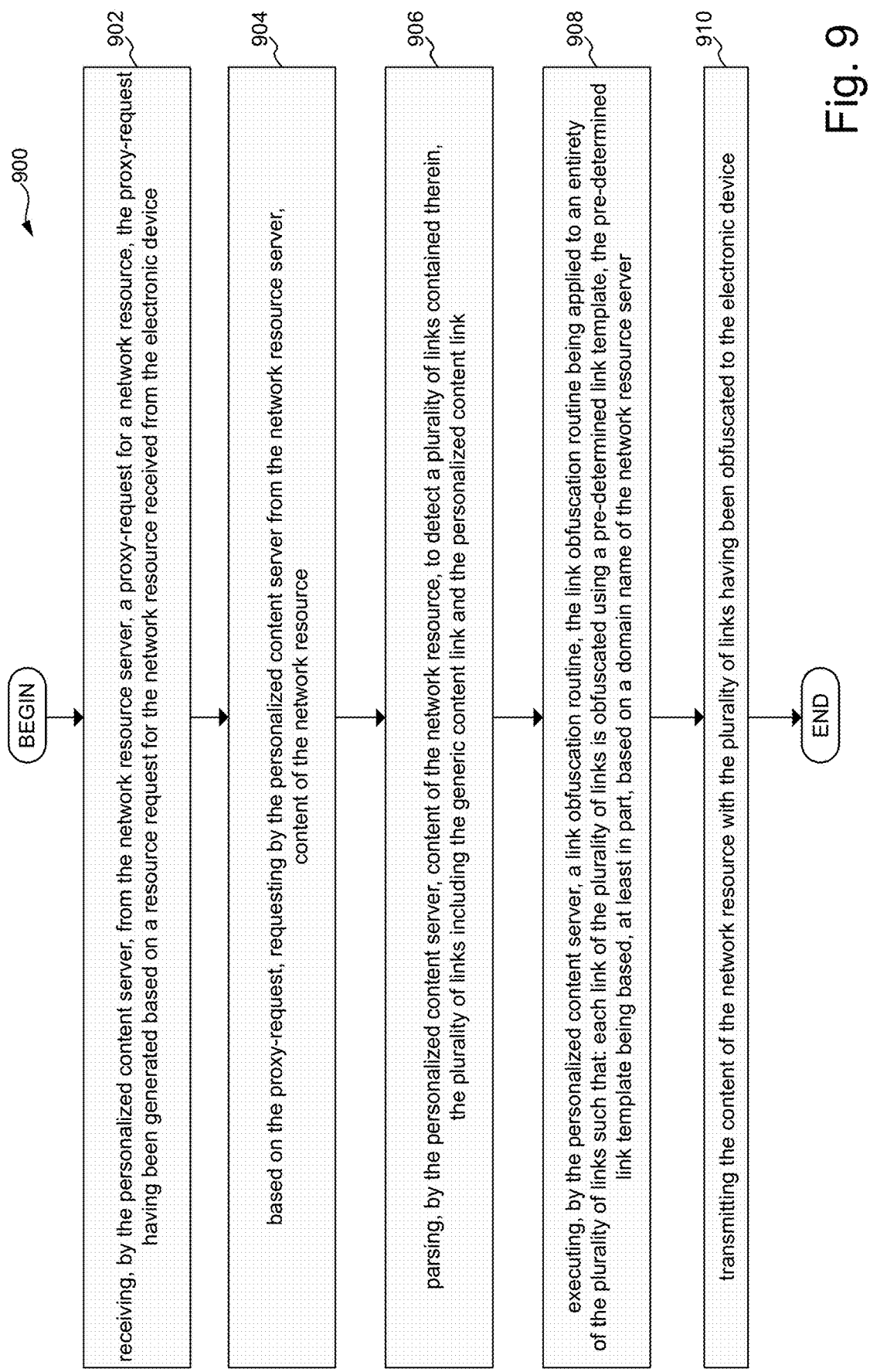
FIG. 9 depicts a block diagram of a flow chart of a method for transmitting a personalized message to an electronic device, the method being implemented within the system of FIG. 2 in accordance with some non-limiting embodiments of the present technology.

Given the architecture described above, it is possible to execute a method of sending personalized content to the electronic device 202 associated with the user 204. With reference to FIG. 9, there is depicted a block diagram of a method 900, the method 900 being implemented in accordance with non-limiting embodiments of the present technology. In some embodiments, the method 900 can be executed in the system 200, the system 200 including: the communication network 206; the network resource server 210 hosting a network resource 212 and accessible via the communication network 206, the network resource 212 having a generic content portion 302 and a personalized content portion 304; the electronic device 202 configured to access the network resource 212 via the communication network 206, the personalized content server 214 coupled to the communication network 206 and accessible by the network resource server 210 and the electronic device 202 via the communication network 206.

Step 902—receiving, by the personalized content server, from the network resource server, a proxy-request for a network resource 212, the proxy-request having been generated based on a resource request for the network resource 212 received from the electronic device The method 900 begins at step 902, where the personalized content server 214 receives, from the network resource server 210, a proxy-request for a network resource 212, the proxy-request having been generated based on a resource request for the network resource 212 received from the electronic device 202. This step is depicted as a signal flow 608 in FIG. 6.

Step 904—based on the proxy-request, requesting by the personalized content server from the network resource server, content of the network resource 212

At step 904, based on the received proxy-request (as part of the signal flow 608), the personalized content server 214 requests from the network resource server 210, content of the network resource 212. This is depicted as the signal flow 610 in FIG. 6.

Step 906—parsing, by the personalized content server, content of the network resource 212, to detect a plurality of links contained therein, the plurality of links including the generic content link and the personalized content link At step 906, the personalized content server 214 parses the content of the network resource 212 that was received as part of the signal flow 610. The parsing is executed in order to detect the plurality of links contained in the so-received network resource 212, the plurality of links including the generic content link 306 and the personalized content link 308.

Step 908—executing, by the personalized content server, a link obfuscation routine, the link obfuscation routine being applied to an entirety of the plurality of links such that: each link of the plurality of links is obfuscated using a pre-determined link template, the pre-determined link template being based, at least in part, based on a domain name of the network resource server At step 908, the personalized content server 214 executes a link obfuscation routine (depicted in FIG. 6 at 614), the link obfuscation routine 614 being applied to an entirety of the plurality of links such that: each link of the plurality of links is obfuscated using a pre-determined link template, the pre-determined link template being based, at least in part, based on a domain name of the network resource server 210.

Step 910—transmitting the content of the network resource with the plurality of links having been obfuscated to the electronic device At step 910, the personalized content server 214 transmits the content of the network resource with the plurality of links having been obfuscated to the electronic device 202 (this is depicted as the signal flow 616 in FIG. 6).

Execution of the method 900 as described above enables the electronic device 202 to retrieve the generic content portion 302 and the personalized content portion 304 using the obfuscated links. What follows id description of some non-limiting embodiments of how the electronic device 202 can process the so-received obfuscated links, as well as some non-limiting embodiments of the implementation of the method 900.

In some embodiments of the method 900, the personalized content server 214 receives, from the network resource server 210, a content proxy-request for the network resource 212, the content proxy-request having been generated by the network resource server 210 responsive to receiving a content retrieval request, which content retrieval request was generated by the electronic device in response to the plurality of links having been obfuscated by the personalized content server 214. This is depicted in FIG. 6, as a sequence of the signal flows 618 (the content retrieval request) and the signal flow 620. The sequence of the signal flows 618 (the content retrieval request) and the signal flow 620 is executed in response to the electronic device 202 processing the network resource 212 with the obfuscated links that the electronic device has obtained as part of the signal flow 616.

In some non-limiting embodiments of the method 900, the personalized content server 214 further executes a link de-obfuscation routine (depicted in FIG. 6 at 622), the link de-obfuscation routine 622 being applied to the entirety of the plurality of links that have been obfuscated to extract de-obfuscated links, including the generic content link 306 and the personalized content link 308.

In some non-limiting embodiments of the method 900, the personalized content server 214, retrieves, based on the generic content link, the generic content portion 302 and, based on the personalized content link, the personalized content portion 304. In these embodiments of the present technology, the method 900 further comprises transmitting the generic content portion 302 and the personalized content portion 304 to the electronic device 202 (depicted as the signal flow 628 in FIG. 6).

In some non-limiting embodiments of the method 900, the proxy-request comprises an indication of at least one user-parameter and the indication of at least one user-parameter is used to select a particular one of the personalized content portions 304 in response to receiving the content proxy-request. This process is depicted in FIG. 6 as signal flows 624 and 626.

In some non-limiting embodiments of the method 900, the proxy-request was generated by the network resource server 210 in response to the resource request received by the network resource server 210 containing a pre-determined processing flag. The pre-determined processing flag can be generated based on an embedded script, the embedded script having been executed as part of a previous network resource downloading from the network resource server 210 to the electronic device 202. Embodiments of the present technology contemplate several implementations for how the pre-determined processing flag can be generated. Some of these non-limiting embodiments were described above. Just as one example, the embedded script is configured to detect blocking software executed by the electronic device 202.

Details of the Link Obfuscation Routine and the Obfuscation Links

In some non-limiting embodiments of the method 900, the executing the link obfuscation routine 614 results in: the generic content link 306 being obfuscated into an obfuscated generic content link; the personalized content link 308 being obfuscated into an obfuscated personalized content link; while both the obfuscated generic content link and the obfuscated personalized content link have the same format based on the pre-determined link template.

In some non-limiting embodiments of the method 900, the same format of both the obfuscated generic content link and the obfuscated personalized content link cause them to point, when executed by the electronic device 202, to the domain name of the network resource server 210.

In some non-limiting embodiments of the method 900, the same format has a common portion 704 and an individualized portion 706 (FIG. 7), the common portion 704 being based on the domain name and the individualized portion 706 being based on a type of content to which an associated link is pointing to.

In some non-limiting embodiments of the method 900, the individualized portion 706 comprises a key portion 705 and an encoded portion 708, 710, 712, the key portion indicating 705 a key used for obfuscating the encoded portion 708, 710, 712.

In some non-limiting embodiments of the method 900, the encoded portion 708, 710, 712 comprises at least two sets of characters separated by a respective special character, the key portion 705 indicating a type and a number of the respective special characters.

In some non-limiting embodiments of the method 900, the number of sets and the corresponding number of the respective special characters is randomly selected.

In some non-limiting embodiments of the method 900, the special characters is one of a slash and a group of alpha-numeric characters.

In some non-limiting embodiments of the method 900, the key portion 704 is periodically changed.

Other Obfuscation Routines

In some non-limiting embodiments of the method 900, the link obfuscation routine 614 is not the only obfuscation routine executed by the personalized content server 214. As such, in some non-limiting embodiments of the present technology, the method 900 further comprises the personalized content server 214 executing a DOM-tree obfuscating routine, the DOM-tree obfuscating routine for changing at least one of an identifier and a class associated with at least one DOM-tree element.

In some non-limiting implementations of the method 900, the least one DOM-tree element is associated with the personalized content portion 308. In other embodiments of the present technology, the least one DOM-tree element is associated with both the personalized content portion 308 and the generic content portion 302.

In some non-limiting embodiments of the present technology, the method 900 further comprises the personalized content server 214 executing an additional obfuscating routine, the additional obfuscating routine for changing at least one additional content 310 of the network resource 212. The at least one additional content 310 can be at least one of: an image, a Cascading Style Sheet, and a JAVA-script.

Cookie Matching

As has been alluded to above, in some embodiments of the present technology, the pre-determined processing flag is generated by the above mentioned applet 320 of a previous network resource loaded to the electronic device 202 in response to a pre-determined condition. In some embodiments of the present technology, the pre-determined condition is execution by the browser application 208 an ad-block software. For example, in response to the previous network resource that has been downloaded to the electronic device 202 having detected the presence of the ad-block software (for example, by executing the applet 320), the applet 320 may have provisioned the user cookie with an indication of the pre-determined processing flag.

This is particularly applicable where the network resource server 210 is a partner site of the personalized content server 214 in a sense that the network resource server 210 has subscribed to the personalized content selection service provided by the personalized content server 214. Alternatively or additionally, this is applicable where the personalized content generation routine 604 is executed as part of the personalized content server 214 or at a separate server that is under control and/or management of the same entity as the proxy server routine 602.

Figure 8:
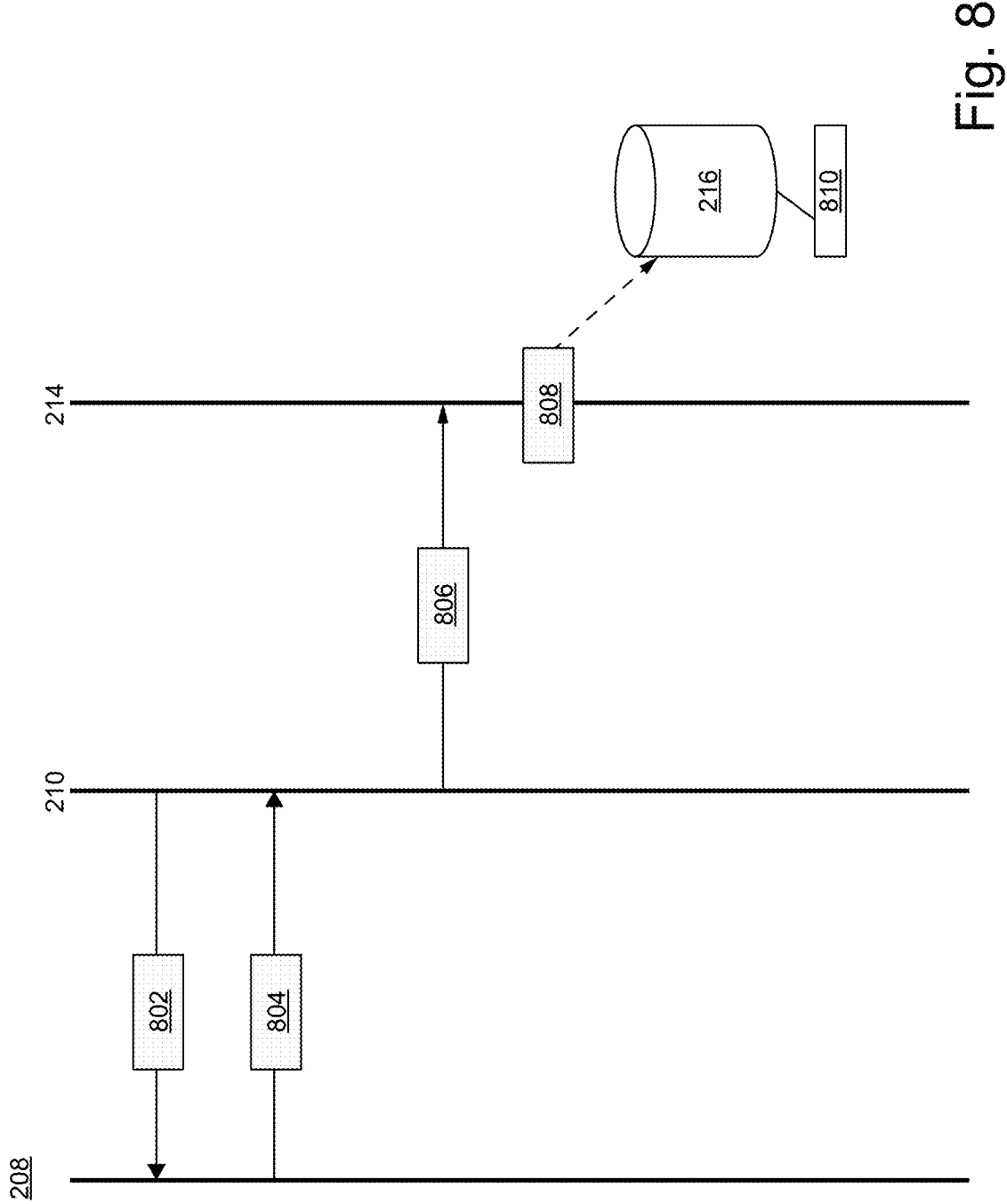
FIG. 8 depicts a signal flow diagram between various component of the system of FIG. 2, the signal flows being implemented in accordance to some other non-limiting embodiments of the present technology.

With reference to FIG. 8, there is depicted another signal flow diagram depicting a flow of signals during provisioning of cookies and a cookie matching routine implemented in accordance with some alternative non-limiting embodiments of the present technology. These alternative embodiments are particularly applicable in those circumstances where (i) the network resource server 210 is not the partner site of the personalized content server 214 and/or (ii) the personalized content generation routine 604 is not executed as part of the personalized content server 214 nor at a separate server that is under control and/or management of the same entity as the proxy server routine 602.

The network resource server 210 transmits a signal flow 802 to the browser application 208, the signal flow 802 containing a cookie setting script (for example, set_cookie implemented as a Java-scrip embedded in a previous network resource 212 transmitted to the browser application 208 by the network resource server 210).

The browser application 208 transmits a signal flow 804 to the network resource server 210, the signal flow 804 containing the cookie assigned to the browser application 208 by the network resource server 210. The network resource server 210 transmits a signal flow 806 to the personalized content server 214, the signal flow 806 including the cookie received by the network resource server 210 from the browser application 208. The cookie, thus, enables the electronic device 202 to be identified to the personalized content server 214.

The personalized content server 214 executes a cookie matching routine 808 by matching the cookie received as part of the signal flow 806 to a cookie format known to the personalized content server 214. In an example, the format known to the personalized content server 214 can be a cookie format used for generating personalized content by the personalized content server 214.

An example of the signal flow 806 can look as follows:
<an.domain.com/mapuidktag>/<ext_uid>

In some embodiments of the present technology, the <tag> is pre-assigned to each of the third-party personalized content servers 214. The <ext_uid> parameter is the client identifier of the user that has been assigned by the personalized content server 214.

The personalized content server 214 stores the matched cookie as an entry 810 in the personalized content database 216. An example of the entry 810 can be implemented as follows:
<ext_uid>:<native_uid>

Where the ext_uid is the cookie format assigned to the browser application 208 and the native_uid is the native cookie format known to the personalized content server 214. The entry 810 can be used for mapping the ext_uid received during various signal flows to determine the native_uid that is then used for selecting specific stored personalized content 502.

In some yet additional embodiments of the present technology, the signal flow 802 causes the browser application 208 to reload the network resource 212, with a proxying to the personalized content server 214 (either directly or via the network resource server 210).

The nature of the targeted message is not particularly limited. In some embodiments of the present technology, the targeted message can be a banner ad. The targeted message can be embodied in any other kind of a targeted message: a promotional message, an informational message, a banner ad, a text ad, and the like.

In some embodiments of the present technology, a technical advantage can be enjoyed by delivering the personalized content according to embodiments of the present technology. By delivering personalized content as described herein, the user 204 may be able to obtain information the user 204 is interested in with fewer interactions with the network resource server 210, thus, reducing bandwidth consumption and/or load on the network resource server 210. Alternatively, the user 204 may be able to obtain knowledge of personalized content without extensive browsing or searching. Thus, not only this is more convenient for the user, but also reduced load on the network resource server 210 and the communication network 206. Additionally, faster obtaining of information can reduce the load on a battery of the electronic device 202, which is particularly useful but is not limited to those embodiments where the electronic device 202 is implemented as a wireless electronic device.

Figure 10:
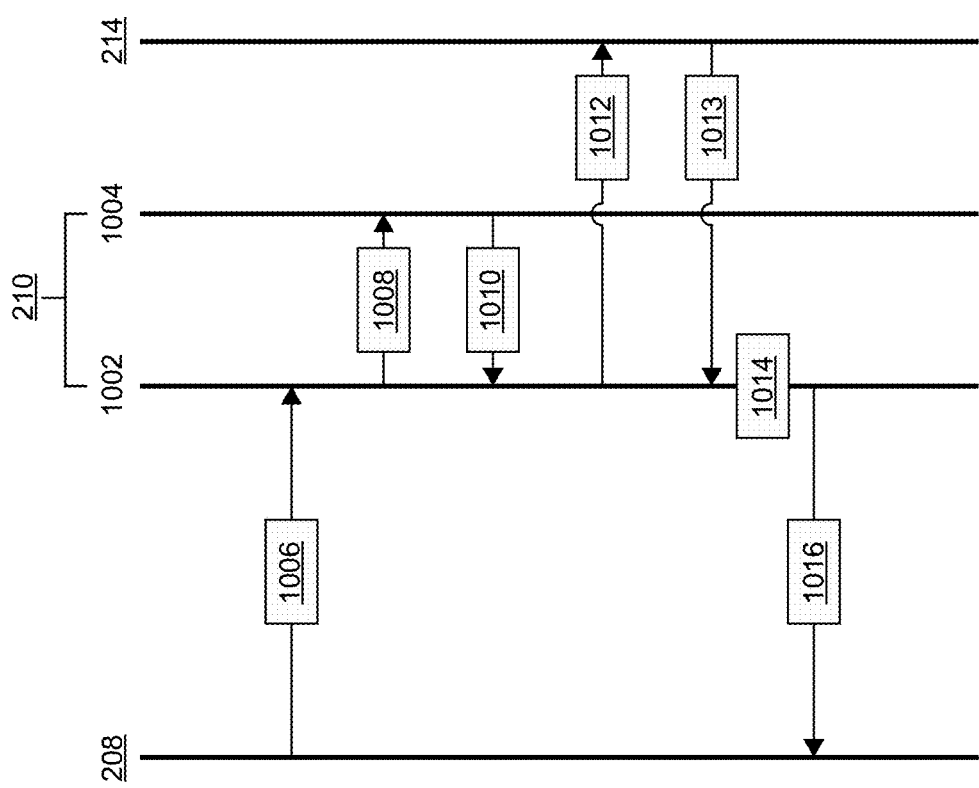
FIG. 10 depicts a signal flow diagram between various component of the system of FIG. 2, the signal flows being implemented in accordance to some other non-limiting embodiments of the present technology.

With reference to FIG. 10, there is depicted a signal flow diagram depicting flow of information between the various components of the system 200 during the execution of the methods in accordance with another non-limiting embodiment of the present technology. More specifically, FIG. 10 depicts the browser application 208 executed by the electronic device 202, the network resource server 210, and the personalized content server 214. In the embodiment illustrated by FIG. 10, the network resource server 210 is implemented by a cloud service.

As is illustrated in FIG. 10, the cloud service network resource server 210 executes two sub-routines—a proxy server routine 1002 and generic content generation routine 1004. In various embodiments of the present technology, the generic content generation routine 1004 and the proxy server routine 1002 can be executed as a software routine by a single server (i.e. a server hosting or operating the cloud service). In other embodiments of the present technology, each of the generic content generation routine 1004 and the proxy server routine 1002 can each be executed by a dedicated server.

As part of a signal flow 1006, the browser application 208 transmits a content request to the network resource server 210. The content request depicted as part of the signal flow 1006 can be generated by the browser application 208 according to any of the examples described with respect to the content request 606.

In accordance with non-limiting embodiments of the present technology, the network resource server 210 analyzes the content of the content request received as part of the signal flow 1006. In some embodiments of the present technology, the network resource server 210 analyzes the content of the content request received as part of the signal flow 1006 for presence of a pre-determined processing flag. In some embodiments of the present technology, the content request received as part of the signal flow 1006 may contain a user identifier (such as a "user cookie" associated with the electronic device 202 and pre-assigned by the network resource server 210, or the like) identifying the requester associated with the content request (the identification may be through one or both of an identity of a user and identity of the electronic device 202).

In response to the network resource server 210 determining that the content of the content request received as part of the signal flow 1006 contains a pre-determined processing flag, the proxy server routine 1002 of the network resource server 210 generates a signal flow 1008 destined to the generic content generation routine 1004 and a signal flow 1012 destined to the personalized content server 214.

It is noted that the network resource server 210 determines that the personalized content server 214 that needs to be the destination of the signal flow 1012 based on the fact that the personalized content portion 304 of the requested network resource 212 is associated with the personalized content server 214. Such association may be stored in an internal memory (not depicted) or another database maintained by the network resource server 210.

The signal flow 1008 contains a request for the network resource 212 from the generic content generation routine 1004. The generic content generation routine 1004 then retrieves the generic content portion requested in the content request of the signal flow 1006. In some embodiments of the present technology, the generic content generation routine 1004 could retrieve the generic content of the requested network resource 212 from storage integral with the network resource server 210, or otherwise managed by the cloud service. In some embodiments, the generic content generation routine 1004 could retrieve the generic content of the requested network resource 212 from a separate server or cloud service. The generic content generation routine 1004 then generates a signal flow 1010 destined to the proxy server routine 1002, containing the content of the requested network resource 212.

The signal flow 1012 contains a request for an indication of a plurality of links contained in the network resource 212, based at least in part on the pre-determined processing flag discussed above. The personalized content server 214 then generates a signal flow 1013 destined to the proxy server routine 1002, containing at least the indication of a plurality of links contained in the network resource 212.

As part of the signal flows 1010 and 1013, the proxy server routine 1002 of the network resource server 210 receives the content of the requested network resource 212 and, more specifically, the indication of a plurality of links contained in the network resource 212 (including the first link 306 and the second link 308).

The proxy server routine 1002 of the network resource server 210 parses the received content of the signal flows 1010 and 1013 to extract the plurality of links contained in the network resource 212 (including the first link 306 and the second link 308). The proxy server routine 1002 then executes a link obfuscation routine, depicted in FIG. 10 at 1014. As part of the link obfuscation routine 1014, the proxy server routine 1002 of the network resource server 210 obfuscates each one (and all) of the plurality of links contained in the network resource 212 (including the first link 306 and the second link 308), as described above with regards to FIG. 6.

The proxy server routine 1002 of the server 210 generates a signal flow 1016, the signal flow 1016 containing the network resource 212 with the plurality of obfuscated links. The proxy server routine 1002 of the server 210 then transmits the signal flow 1016 to the browser application 208 of the electronic device 202.

The browser application 208 receives the signal flow 1016 and retrieves the network resource 212. The browser application 208 starts to process the content of the network resource 212. When the browser application 208 encounters an obfuscated link, it generates a respective signal flow to the network resource server 210 (recalling that the obfuscated links are based at least in part on the domain name of the network resource server 210), the respective signal flow being a "call" for content based on the respective obfuscated link, as discussed above with the signal flows 618, 620, and 628.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of sending personalized content to an electronic device associated with a user, the method executable in a personalized content system, the personalized content system including:
 a communication network;
 a network resource server hosting a network resource and accessible via the communication network;
 the electronic device configured to access the network resource via the communication network,
 a personalized content server coupled to the communication network and accessible by the network resource server and the electronic device via the communication network;
 the network resource having a generic content link and a personalized content link; the generic content link for accessing a generic content portion hosted by the network resource server to be displayed as part of the network resource when displayed by the electronic device and the personalized content link for accessing a personalized content portion hosted by the personalized content server to be displayed as part of the network resource when displayed by the electronic device;
 the method comprising:
  receiving, by the personalized content server, from the network resource server, a proxy-request for a network resource, the proxy-request having been generated based on a resource request for the network resource received from the electronic device;
  based on the proxy-request, requesting by the personalized content server from the network resource server, content of the network resource;
  parsing, by the personalized content server, content of the network resource, to detect a plurality of links contained therein, the plurality of links including the generic content link and the personalized content link;

executing, by the personalized content server, a link obfuscation routine, the link obfuscation routine being applied to an entirety of the plurality of links such that:

each link of the plurality of links is obfuscated using a pre-determined link template, the pre-determined link template being based, at least in part, based on a domain name of the network resource server;

transmitting the content of the network resource with the plurality of links having been obfuscated to the electronic device.

2. The method of claim 1, further comprising receiving, by personalized content server, from the network resource server, a content proxy-request for the network resource, the content proxy-request having been generated by the network resource server responsive to receiving a content retrieval request, which content retrieval request was generated by the electronic device in response to the plurality of links having been obfuscated by the personalized content server.

3. The method of claim 2, the method further comprising:
executing, by the personalized content server, a link de-obfuscation routine, the link de-obfuscation routine being applied to the entirety of the plurality of links that have been obfuscated to extract de-obfuscated links, including the generic content link and the personalized content link.

4. The method of claim 3, the method further comprising based on the generic content link retrieving the generic content portion and based on the personalized content link retrieving the personalized content portion; and wherein the method further comprises transmitting the generic content portion and the personalized content portion to the electronic device.

5. The method of claim 1, wherein the proxy-request comprises an indication of at least one user-parameter and wherein the indication of at least one user-parameter is used to select a particular one of the personalized content portions in response to receiving the content proxy-request.

6. The method of claim 1, wherein the proxy-request was generated by the network resource server in response to the resource request received by the network resource server containing a pre-determined processing flag.

7. The method of claim 6, wherein the pre-determined processing flag was generated based on an embedded script, the embedded script having been executed as part of a previous network resource downloading from the network resource server to the electronic device.

8. The method of claim 7, wherein the embedded script is configured to detect blocking software executed by the electronic device.

9. The method of claim 1, wherein executing the link obfuscation routine results in:
the generic content link being obfuscated into an obfuscated generic content link;
the personalized content link being obfuscated into an obfuscated personalized content link; and wherein
both the obfuscated generic content link and the obfuscated personalized content link having the same format based on the pre-determined link template.

10. The method of claim 9, wherein
the same format of both the obfuscated generic content link and the obfuscated personalized content link cause them to point, when executed by the electronic device, to the domain name of the network resource server.

11. The method of claim 9, wherein the same format has a common portion and an individualized portion, the common portion being based on the domain name and the individualized portion being based on a type of content to which an associated link is pointing to.

12. The method of claim 11, wherein the individualized portion comprises a key portion and an encoded portion, the key portion indicating a key used for obfuscating the encoded portion.

13. The method of claim 12, wherein the encoded portion comprises at least two sets of characters separated by a respective special character, the key portion indicating a type and a number of the respective special characters.

14. The method of claim 12, wherein the key portion is periodically changed.

15. The method of claim 1, further comprising executing a DOM-tree obfuscating routine, the DOM-tree obfuscating routine for changing at least one of an identifier and a class associated with at least one DOM-tree element.

16. The method of claim 15, wherein the least one DOM-tree element is associated with the personalized content portion.

17. The method of claim 1, further comprising executing an additional obfuscating routine, the additional obfuscating routine for changing at least one additional content of the network resource.

18. The method of claim 1, wherein the personalized content server is configured to execute a personalized content generation routine and a proxy server routine.

19. The method of claim 18, wherein the personalized content generation routine and the proxy server routine are executed in a distributed manner, each at a dedicated server.

20. A personalized content server, the personalized content server comprising:
a processor;
a memory, accessible by the processor,
a communication interface coupled to the processor and configured for two-way communication over a communication network for communicating with:
a network resource server hosting a network resource and accessible via the communication network;
an electronic device configured to access the network resource via the communication network, the network resource having a generic content link and a personalized content link; the generic content link for accessing a generic content portion hosted by the network resource server to be displayed as part of the network resource when displayed by the electronic device and the personalized content link for accessing a personalized content portion hosted by the personalized content server to be displayed as part of the network resource when displayed by the electronic device;
the processor configured to:
receive, from the network resource server, a proxy-request for a network resource, the proxy-request having been generated based on a resource request for the network resource received from the electronic device;
based on the proxy-request, request from the network resource server, content of the network resource;
parse content of the network resource to detect a plurality of links contained therein, the plurality of links including the generic content link and the personalized content link;

execute a link obfuscation routine, the link obfuscation routine being applied to an entirety of the plurality of links such that:
each link of the plurality of links is obfuscated using a pre-determined link template, the pre-determined link template being based, at least in part, based on a domain name of the network resource server;
transmit the content of the network resource with the plurality of links having been obfuscated to the electronic device.

\* \* \* \* \*